March 5, 1957  R. W. FENEMORE ET AL  2,784,365
THYRATRON INVERTER
Filed Nov. 19, 1953  3 Sheets-Sheet 1

INVENTORS
RONALD WILLIAM FENEMORE
CHARLES JOHN QUARTLY
BY
AGENT

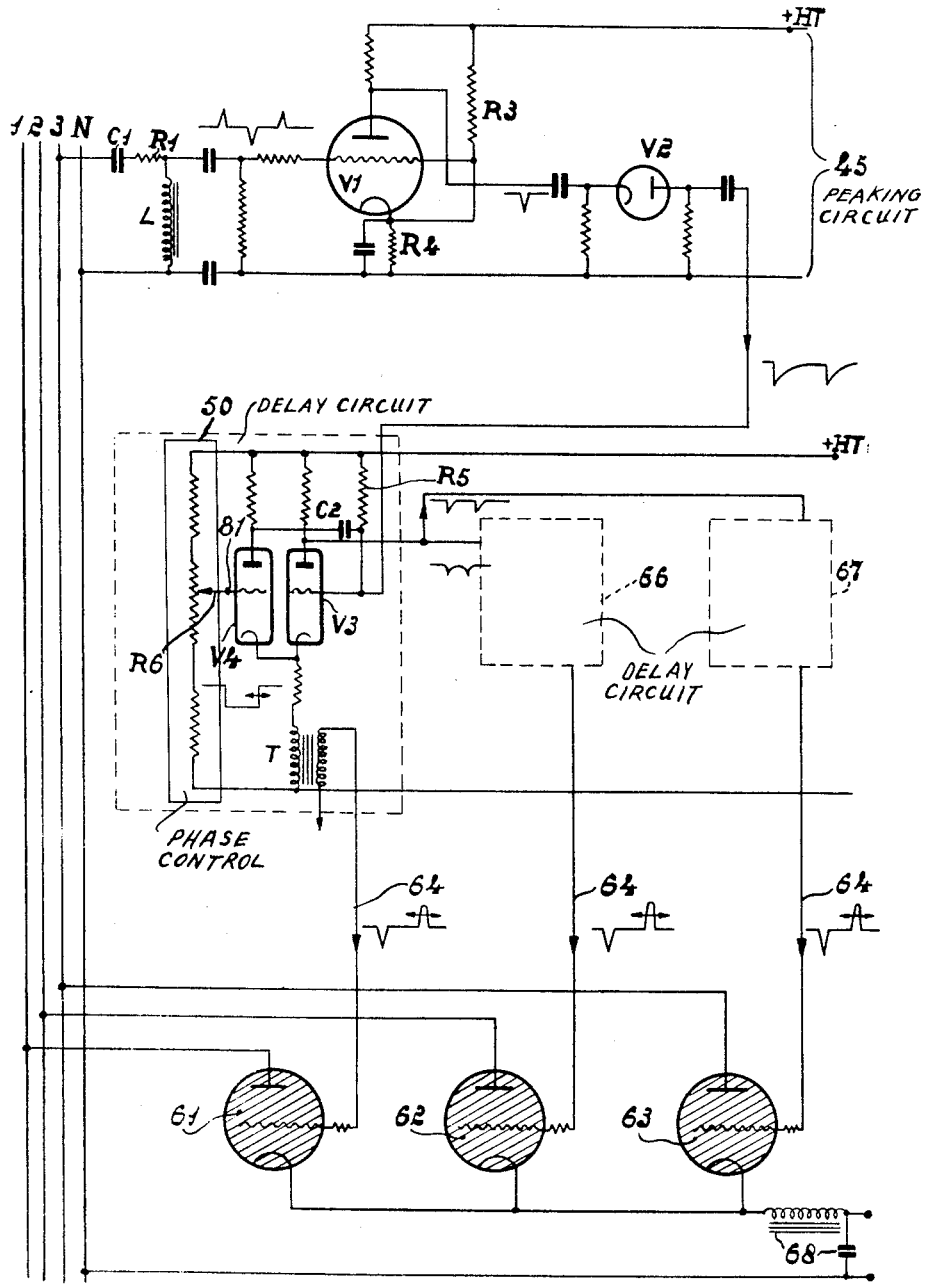

United States Patent Office 2,784,365
Patented Mar. 5, 1957

2,784,365

THYRATRON INVERTER

Ronald William Fenemore, Coulsdon, and Charles John Quartly, South Nutfield, England, assignors to Hartford National Bank and Trust Company, Hartford, Conn., as trustee Application November 19, 1953, Serial No. 393,132

Claims priority, application Great Britain December 4, 1952

4 Claims. (Cl. 318—230)

The present invention relates to thyratron inverters for converting direct current into alternating current.

It is an object of the invention to provide an improved inverter the frequency of which can readily be varied and controlled with a high degree of accuracy.

In a polyphase inverter according to the broadest aspect of the invention, the thyratron grids are controlled by a variable frequency firing-pulse generator, with intermediate means for distributing successive firing pulses cyclically to the thyratron grids.

Preferably, with three or more phases, the distributing means are constituted by a ring counting circuit. Thus, for example with a three-phase inverter the firing-pulse generator will have a frequency three times that of the inverter output, the firing pulses being distributed cyclically to three thyratrons or three sets of thyratrons.

Due to the ease and accuracy with which their frequency can be controlled, such inverters are very suitable for the supply and control of motors, e. g. synchronous motors but more especially asynchronous induction motors of squirrel cage or like type. Such arrangements are particularly useful in drives for machine tools, lathes, and the like, having tool carriages or other elements required to be actuated with great precision at constant speeds or according to some prearranged sequence.

It is well known that induction motors require approximately constant energising flux and this may be obtained by maintaining the supply voltage approximately proportional to the supply frequency. In accordance with this principle, and according to a further aspect of the present invention, a supply and control system for an induction motor includes a thyratron inverter, a variable-frequency firing-pulse generator for controlling the or each inverter thyratron, a thyratron rectifier system for supplying D. C. current to the or each inverter thyratron, and means for variably phasing the grid or grids of the rectifier thyratron system in consonance with variations in the firing pulse frequency so as to maintain approximately constant magnetic flux in the motor during operation.

Specific embodiments of the invention will now be described by way of example with reference to the accompanying drawings in which:

Fig. 3 is a schematic diagram of a simplified circuit of a rectifier and phasing arrangement suitable for the control system of Fig. 2.

Figure 1:
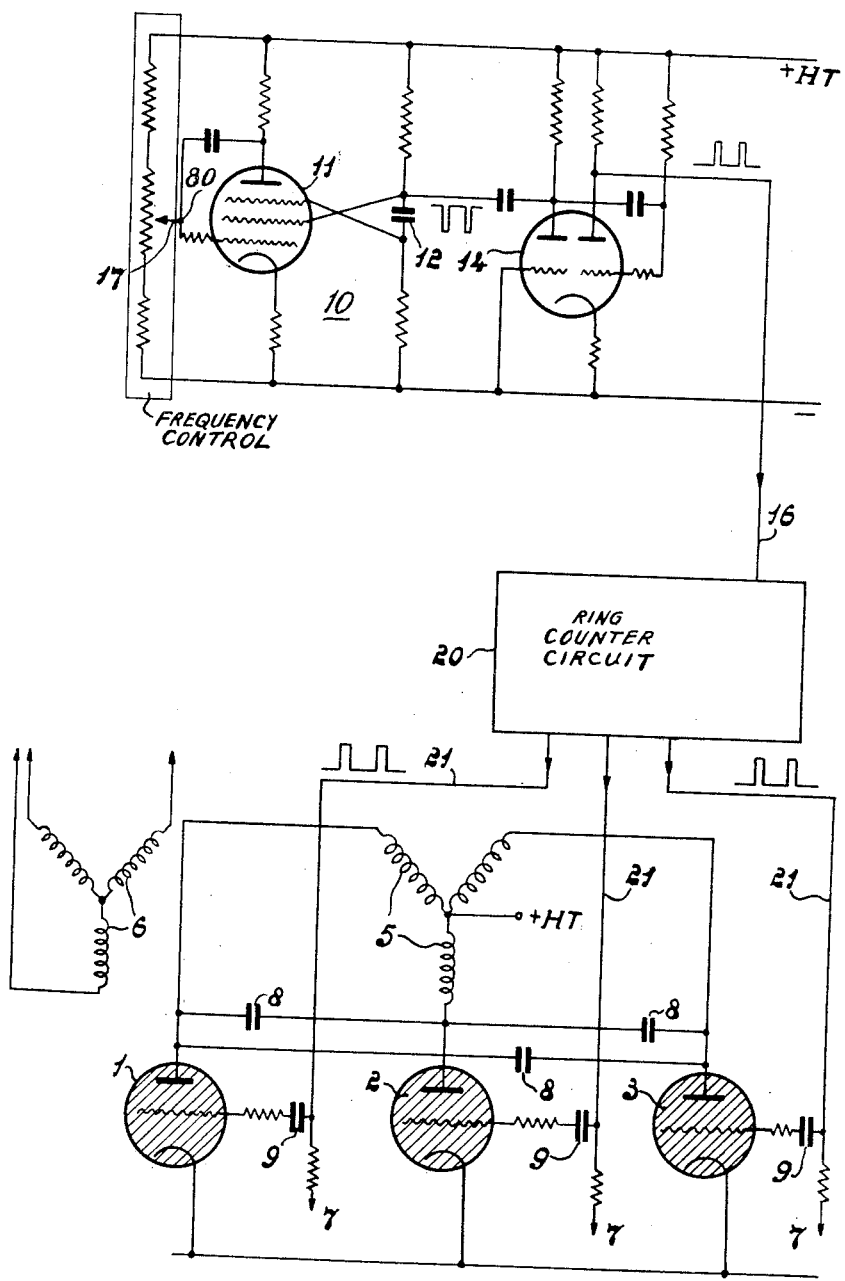
Fig. 1 is a schematic diagram of an embodiment of the circuit of a three-phase inverter of the present invention including its firing or trigger system.

Referring now to the drawings, and more particularly to Fig. 1, the variable frequency three-phase inverter includes three thyratrons 1, 2 and 3 with their anodes star-connected to a D. C. high voltage supply through the primary windings 5 of output transformers having secondary windings 6.

The grids of the thyratrons are connected, as at 7, to an appropriate source of negative bias and said grids receive in rotation firing or trigger pulses from a pulse generator or oscillator 10 via a ring counting or scale-of-three counting circuit 20, lines 21 and series capacitors 9.

The counting circuit 20 may be for example of a known general type employing cold cathode tubes.

Three capacitors 8 are connected in a ring or delta between the anodes of the thyratrons 1, 2, 3 and operate in such manner as to extinguish automatically one thyratron when the next thyratron is fired. For example, if tube 2 is conducting at a particular instant and tube 3 is then fired by a pulse, the anode of the latter tube will drop in potential due to the current taken. This potential drop will be passed momentarily to the anode of tube 2 and will be sufficient to extinguish tube 2 in the absence of a firing pulse. The anode drop will also be communicated to tube 1, but ineffectively, since tube 1 will already be in the extinguished condition.

It will be understood that the output frequency of each of the thyratrons 1, 2, 3 will be one third of the frequency of the oscillator 10.

Figure 2:
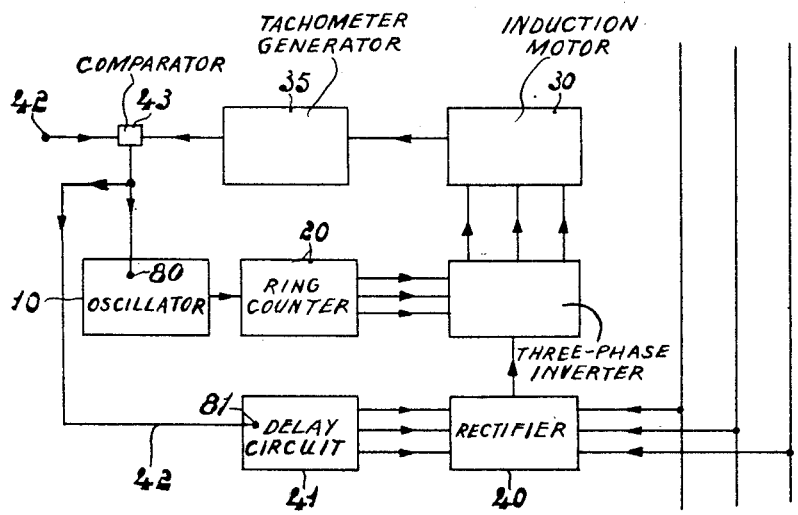
Fig. 2 is a block schematic diagram of an embodiment of a three-phase motor supply and control system of the present invention.

The pulse generator 10 comprises a known transitron type oscillator 11, 12 followed by a pulse-shaping double-triode stage 14, the firing pulses being taken to the counter 20 by a line 16. The frequency of the oscillator may be adjusted or set by a frequency control voltage applied to the point 80 from a source 17 which may be a potentiometer connected across the H T supply as shown or may be an external reference or control voltage source, for example a comparator as later to be more fully pointed out with reference to Fig. 2.

As aforementioned, one of the principal applications of the variable A. C. inverter source according to the invention is the supply and accurate control of the speed of an induction motor, and such an arrangement is shown in block schematic form in Fig. 2.

A variable frequency oscillator 10 passes firing pulses through a ring counter 20 to a three-phase inverter having thyratrons 1, 2 and 3, all of which may be as described with reference to Fig. 1.

The inverter 1, 2, 3 feeds an induction motor 30 which may for example be used to drive the tool carriage of a lathe or some similar component of a machine tool.

The well known requirement of induction motors that the applied voltage be substantially proportional to the supply frequency, can readily be met in the present system by varying the D. C. supply to the inverter 1, 2, 3 and thereby varying the amplitude of the A. C. output of said inverter. Thus in the present example the A. C. power supply, which is shown three-phase, but could for example be single-phase if desired, is rectified at rectifier 40 by thyratrons the power output of which is varied by appropriate phasing pulses distributed by a delay circuit 41.

Automatically simultaneous control of such phasing with changes of frequency at the oscillator 10, may be effected by a common control voltage applied at a terminal 42, and such voltage may vary in some predetermined manner or be a fixed reference potential derived from a standard cell or the like, according to the operation to be carried out by the motor 30.

However, improved accuracy can be obtained by the provision of a feedback tachometer generator 35 on or driven by the shaft of the motor 30, the output voltage thereof being balanced against the control voltage from terminal 42 in a comparator 43. Signals from the comparator 43 adjust the frequency of the oscillator 10 and the delay-constant of circuits 41 only when there is a lack of balance in either direction at the comparator.

One example of rectifier and delay circuit 40, 41 is illustrated in Fig. 3, which shows a peaking circuit 45 for producing short pulses at the A. C. power supply frequency, and a controllable delay circuit 50 for phasing said pulses in response to a control voltage applied to the point 81, i. e. a control voltage applied from the terminal 42 through the comparator 43 (see Fig. 2) or alternately derived from a potentiometer $R_6$ as shown in Fig. 3. The phased pulses are taken to the first of three rectifier thyratrons 61 via a line 64, and accurate control of the D. C. power output and voltage is thereby obtained.

The circuits of Fig. 3 will now be described in greater detail.

Any one phase of the A. C. power supply is taken and applied to a saturable core reactor L. Capacitor $C_1$ and resistor $R_1$ are combined voltage dropper and phase adjuster to ensure that the output covers the required range. The pulse output from L is applied to the grid of tube $V_1$ which is normally cut off by the voltages set up in network $R_3$ and $R_4$. The positive pulses cause the tube $V_1$ to conduct so that the output from the anode consists of negative pulses at 50 cycles per second. These pulses are used to trigger the first delay circuit 50 having triode sections $V_3$ and $V_4$.

The leading edge of each pulse is used to cut tube $V_3$ off. A diode $V_2$ is inserted to eliminate the sharp trailing edge of the pulse which would otherwise cause tube $V_3$ to conduct again.

The action of the delay circuit 50 is as follows. Before the trigger pulse arrives, tube $V_3$ is conducting and tube $V_4$ is cut off since the grid of tube $V_3$ is connected to potential source H. T. and the rise in common cathode voltage caused by tube $V_3$ conducting is sufficient to bias tube $V_4$ beyond cut off. The incoming negative going pulse is sufficient to cut tube $V_3$ off so that the bias applied to tube $V_4$ is removed and tube $V_4$ conducts. The consequent drop in anode voltage of tube $V_4$ is transferred to the grid of tube $V_3$ by means of capacitor $C_2$ so that the grid of tube $V_3$ is made even more negative with respect to its cathode.

The capacitor $C_2$ will then begin to charge through a resistor $R_5$ (which may have a value of 5 megohms) until the voltage on the grid of tube $V_3$ is sufficient for said tube to conduct again. At this point the circuit will return to its original state. The time taken for the capacitor $C_2$ to charge through resistor $R_5$ will depend upon the voltage rise needed on the grid of tube $V_3$, i. e. upon the original voltage drop of the tube $V_4$ anode. This drop is controlled by the current which flows through tube $V_4$ in its conducting state. This current is in turn regulated by the bias on the grid of the tube derived from the comparator 43 (Fig. 2) or alternatively from the grid potentiometer $R_6$ as shown in Fig. 3.

Since the tubes $V_3$ and $V_4$ have different anode loads they carry different currents when conducting and tube $V_3$ is normally saturated while tube $V_4$ is not. The cathode output will be a negative going square wave as shown, the position of the trailing edge being variable in time by the variation of the grid bias on tube $V_4$. This waveform also passes through a pulse transformer T which produces an output as shown.

The phased pulses from the delay circuit 50 are also taken to a delay circuit 66 which applies a further fixed delay of 6.66 milliseconds for the control of the second rectifying thyratron 62, and to a delay circuit 67 which applies a fixed delay of 13.33 milliseconds for the control of the third thyratron 63. The variable D. C. output is finally passed to the inverter through an appropriate smoothing circuit 68.

Whereas balanced D. C. control and tachometer voltages are employed in the arrangement described with reference to Figs. 2 and 3, alternating voltages may be employed if desired with an A. C. tachometer and appropriate modifications of the circuit, and in either event the motor speed may in practice be controlled within an accuracy of the order of ±1%.

Although three-phase systems have been illustrated, it will be understood that the invention may be applied to motor control systems having any number of phases including systems for single phase motors, e. g. of the capacitor-start type.

While the invention has been described by means of specific examples and in a specific embodiment, we do not wish to be limited thereto, for obvious modifications will occur to those skilled in the art without departing from the spirit and scope of the invention.

What is claimed is:

1. A supply and control system for an induction motor, comprising a polyphase thyratron inverter arrangement comprising a plurality of thyratrons each having a grid and an output circuit, said output circuits being interconnected to provide a voltage source having a given number of phases equal to that of said plurality of thyratrons, each of said phases providing a voltage having a predetermined frequency equal to that of each of the other of said phases, said induction motor being coupled to said voltage source, a variable frequency firing pulse generator for producing firing pulses of predetermined frequency, means for selectively applying successive firing pulses from said generator cyclically to the grid of successive thyratrons to successively fire each thyratron of said plurality of thyratrons, a thyratron rectifier system connected to said plurality of thyratrons to supply direct current thereto, and means for variably phasing a voltage applied to said rectifier thyratron system in consonance with variations in the firing pulse frequency to maintain approximately constant magnetic flux in said motor during operation thereof.

2. A system as set forth in claim 1, wherein said thyratron rectifier system includes two rectifier thyratrons, and wherein said means for variably phasing a voltage applied to the rectifier thyratron system includes means for producing phasing pulses, a variable delay circuit for supplying said pulses to one of said rectifier thyratrons, and at least one fixed delay circuit for applying the pulses produced by said variable delay circuit to the other rectifier thyratron.

3. A system as set forth in claim 1, further including a tachometer generator coupled to said motor, means for deriving a voltage for controlling the speed of said motor, a comparator connected to said pulse generator, and means for applying the output voltage from said tachometer generator and the voltage from said speed controlling means to said comparator whereby the frequency of said pulse generator is varied by the difference between the voltages derived from said tachometer generator and said speed controlling means.

4. An arrangement as set forth in claim 1, wherein said plurality of thyratrons is equal to at least three and wherein said means for selectively applying successive firing pulses comprises a ring counting circuit.

References Cited in the file of this patent

UNITED STATES PATENTS

| | | |
|---|---|---|
| 1,973,055 | FitzGerald | Sept. 11, 1934 |
| 2,585,573 | Moore | Feb. 12, 1952 |
| 2,623,203 | Demuth | Dec. 23, 1952 |